Fig. 1.

Feb. 11, 1936. P. S. MILLER 2,030,386
COMBUSTION CONTROL SYSTEM
Filed Nov. 29, 1933 3 Sheets-Sheet 2

Patented Feb. 11, 1936

2,030,386

UNITED STATES PATENT OFFICE 2,030,386

COMBUSTION CONTROL SYSTEM

Paul S. Miller, New York, N. Y., assignor to John M. Hopwood, Dormont, Pa.

Application November 29, 1933, Serial No. 700,322

19 Claims. (Cl. 236—14)

This invention relates to systems for regulating the supply of air and fuel to furnaces in accordance with fluctuations in load and more particularly to apparatus designed to eliminate the lag or time delay which normally occurs between the adjustments of the fuel and air supplies when an adjustment in one or the other of these supplies is made in response to load change.

In the operation of furnaces, boiler furnaces for example, it is generally known and recognized that if an adjustment is made to increase the combustion air supply, an appreciable and noticeable time lag intervenes before the supply of fuel is increased to the proper amount provided the supply of fuel is controlled by and in accordance with adjustments in the air supply. Therefore, during this period of lag an excess amount of air is supplied to the furnace with the resultant impairment of combustion efficiency. On the other hand, if the air supply is decreased in response to a reduction in furnace load, a time lag intervenes before the supply of fuel is reduced by the proper amount, and again during this lag interval there is a period when the furnace is operating with insufficient air supply and a consequent impairment of efficiency.

An object of this invention is the provision of apparatus that will automatically anticipate adjustments in one or the other of these variables (air and fuel supply), and thereby cause the adjustment of both to occur substantially simultaneously and thereby avoid the time lag which would otherwise occur between the adjustment of these variables when the rate of supply of either is changed to meet variations in load demand.

Other objects of the invention will in part be apparent and will in part be obvious from the following description taken in conjunction with the accompanying drawings in which;

Throughout the drawings and the specification, like reference characters indicate like parts.

Figure 1:
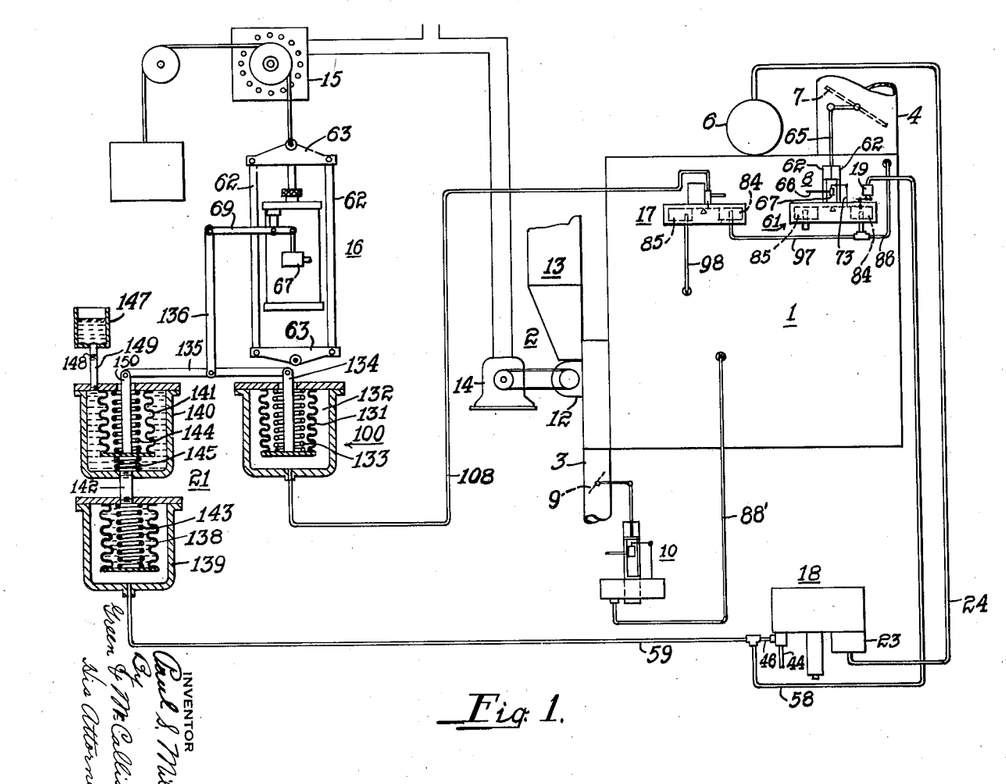
Figure 1 is a more or less diagrammatic view of a boiler furnace and regulating apparatus embodying one form of the invention.

In the drawings and with particular reference to Fig. 1, a boiler furnace 1 is shown which is provided with means 2 for supplying fuel to the furnace; a conduit 3 for supplying air for combustion, and a flue 4 for conveying products of combustion from the outlet of the furnace to a stack (not shown). The steam header or drum of the furnace is indicated at 6.

A damper 7 located in flue 4 is operated by a regulator 8 for regulating the furnace draft; and a damper 9 in air supply conduit 3 is operated by a regulator 10 in such manner that a substantially constant air pressure is maintained in the combustion chamber of the furnace.

The fuel supply means 2 may be of any known form or type and for the sake of illustration, is shown as a powdered fuel feeder 12 that feeds coal from a hopper 13 to the furnace, and which is driven by an adjustable speed motor 14, preferably an electric motor. The speed of motor 14 may be controlled by a rheostat 15 which is operated by a motor device 16. Device 16 is primarily under the control of a regulator 17 which is designed to effect such adjustments in device 16 that the feed motor speed will vary with the weight or amount of gases flowing through the gas passages of the boiler to the outlet flue 4.

In order that efficient combustion shall take place in the furnace for all variations of demand for steam, it is necessary that the proper proportion of air and fuel be maintained for all rates of fuel feed.

Since variations in the steam pressure are indications of the demand of load (a rising pressure indicating that the load is decreasing and a falling pressure indicating that the load is increasing) variations in steam pressure may be utilized to effect the necessary adjustments in the regulators which operate outlet damper 7 and the air supply regulating damper 9, and the feed motor-speed regulating rheostat 15. To this end, a master regulator 18 is provided that responds to variations in steam pressure and transmits a pressure impulse to regulator 8 causing it to adjust the damper in the proper direction, opening the damper on a drop in steam pressure or closing the same on a rise in pressure. Regulator 8 also responds to the pressure of the gases in the outlet of the furnace and so adjusts the damper in the flue that a balance is maintained between the loading pressure sent out by master regulator 18 and the pressure in the flue.

When the outlet damper is adjusted, the pressure in the furnace combustion chamber changes, that is, if damper 7 is adjusted towards open position, the furnace combustion chamber pressure decreases and if damper 7 is moved towards closed position, the furnace combustion chamber pressure rises. Regulator 10 responds to these changes in combustion chamber pressure and shifts the air supply regulating damper 9 towards open position to permit more combustion air to flow to the furnace when the furnace pressure tends to decrease, and shifts the damper towards closed position to reduce the air supply if the chamber pressure tends to rise. These adjustments of damper 7 are made automatically and in such manner that a substantially constant furnace chamber pressure or draft is maintained under all conditions of load at a predetermined point in the combustion chamber of the furnace.

In the system embodying this invention, regulator 18 responds to steam pressure (and consequently to the load demand) and changes the pressure in a loading bellows 19 of regulator 8 which in turn adjusts the outlet damper in such fashion as to maintain the pressure in the furnace outlet in balance with the loading pressure delivered to bellows 19.

The regulation of the fuel supply (as stated previously) is primarily under the control of regulator 17 (which adjusts the rate of fuel feed in accordance with the draft loss across a pass or passes of the boiler gas passages and therefore in accordance with the rate of flow of gases through the boiler) and is secondarily under the control of an anticipator regulator device 21 which in turn is under the control of the master regulator 18. If the steam pressure drops, the master regulator sends a pressure impulse to the anticipator regulator device that causes the rheostat shifting motor 16 to increase the rate at which fuel is fed or delivered to the furnace. The anticipator regulator also operates to initiate such movement of the rheostat operating regulator as to decrease the feeder motor speed and the rate at which fuel is delivered to the furnace when there is a decrease in load on the furnace.

In order that the rate at which fuel is supplied to the furnace may be caused to vary by and in accordance with the weight or quantity of gases flowing through the boiler passes to the flue, the regulator 17 is connected to the furnace at such points that it responds to the pressure drop or draft loss through a portion of the gas passage remote from the combustion chamber. This latter point is preferably at a place in the gas passage far enough removed from the combustion chamber to be beyond the region where the accumulation of slag, soot, and/or fly ash is likely to occur. By so connecting regulator 17 to the gas passages of the furnace, this regulator will respond to the rate of gas flow and cause the rate of fuel feed to be adjusted or regulated by and in accordance with the amount of air delivered to the furnace from the air supply when the furnace is operating at substantially constant load.

If regulator 17 were to be relied on to alone control the rate at which fuel is supplied to the boiler, adjustments in the fuel supply would lag behind adjustments in the rate of air supply. Consequently, during this period of lag, an excess amount of air would be supplied to the furnace in case the adjustments were made in response to an increase in the boiler load, and an insufficient amount of air would be supplied in case the adjustments were made in response to a decrease in the boiler load.

In order to eliminate the lag between the fuel and air supply adjustments, and cause them to be made simultaneously and thereby maintain the proper relation between the air and fuel supply as the load increases or decreases, the anticipator device 21 is utilized and is placed under the control of the master regulator 18. Anticipator device 21 being under the control of the master regulator, said device responds immediately to a change in steam pressure or boiler load and causes the rheostat adjusting motor 16 to move in such direction as to effect an increase in the feeder motor speed, in case the steam pressure falls, and to decrease the feeder motor speed in case the steam pressure rises and the boiler load decreases, and these adjustments are made simultaneously with the adjustments made in the position of the outlet damper 7.

Anticipator 21 is so designed that it operates only during the lag period that would appear if this device were not used so that when this period has elapsed, the fuel supply regulator will have adjusted itself to the changed load conditions and will be in position to take care of the regulation of the fuel supply until another change in load occurs.

The various regulators above mentioned will now be described in detail in order that their mode of operation in the system may be understood.

*Master regulator*

Figures 2, 3, 4:
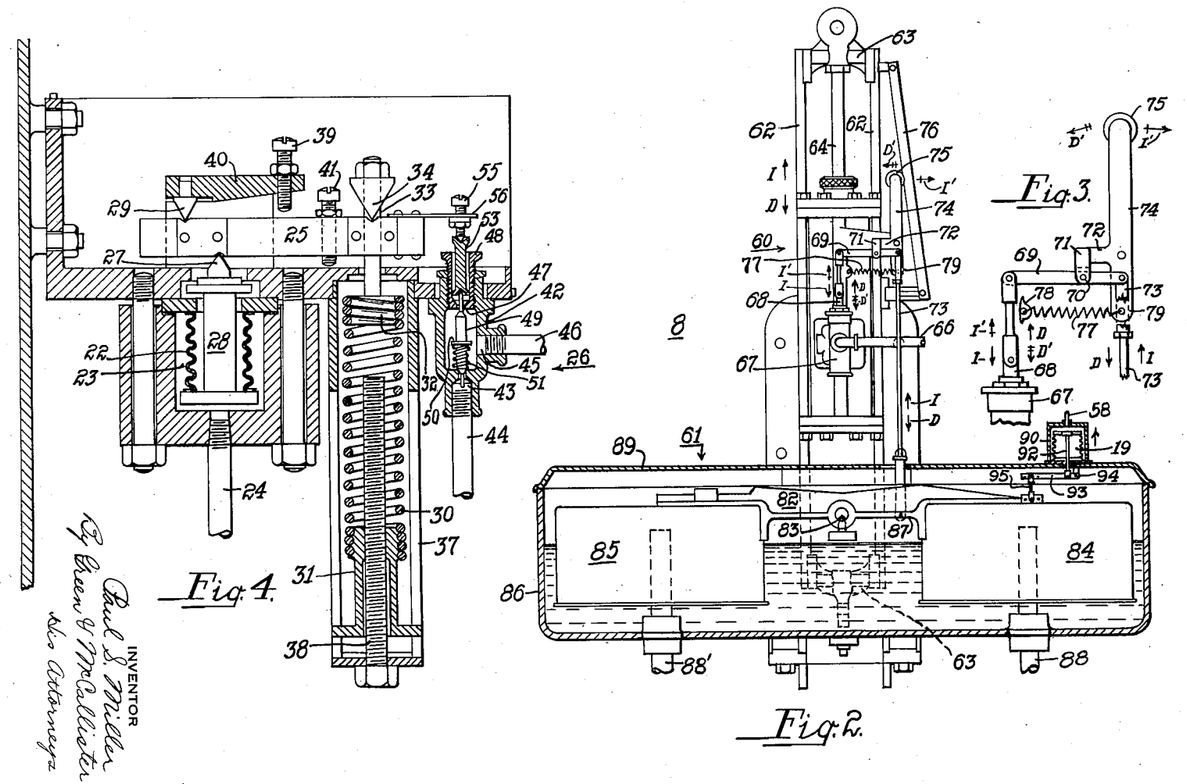
Fig. 2 is a view partly in section of a regulator employed to operate the outlet damper of the furnace.
Fig. 3 is an enlarged view of a system of levers that controls a pilot valve of the regulator.
Fig. 4 is a view in section of a master regulator embodied in the system of Fig. 1 and which responds to steam pressure or load demand.

Master regulator 18 is shown in Fig. 4 and comprises a stiff but resilient metal bellows 22 disposed in a pressure tight chamber 23 to which steam pressure is communicated from the steam header by means of a pipe line 24; a lever 25, and a pilot valve 26 operated by the lever.

Lever 25 rests on a knife-edge 27 carried by a push rod 28 secured to the bellows and which moves up or down as the bellows contracts or expands respectively in response to increasing or decreasing steam pressures. A stationary fulcrum 29 bears on top of lever 25 at a point to the left of knife-edge 27, as seen in Fig. 4, so that as the bellows contracts or expands the lever tends to turn either counterclockwise or clockwise about the fulcrum.

Counterclockwise movement of lever 25 is opposed by a gradient spring 30 one end of which is anchored in a stationary but adjustable support 31 and the other end of which is anchored in a nut 32 from which a rod 33 extends that carries a knife-edge 34 that bears on the topside of lever 25 at a point to the right of the bellows-operated knife-edge 27, as seen in Fig. 4.

The tension in the spring 30 is so adjusted with reference to the steam pressure acting on bellows 22 that whenever a change in steam pressure occurs, the lever will move a predetermined amount until the force exerted by the spring on the lever balances the force exerted by the steam pressure on the lever.

Spring 30 is disposed within a guide or housing 37 and through the bottom of this housing an adjusting screw 38 extends, the screw having screwthread engagement with the anchor 31.

Anchor 31 is provided with helical grooves so that it may be screwed into the spring, as indicated.

The nut 32 to which the upper end of the spring is attached, is also provided with helical grooves so that it may be screwed into or out of the spring. By turning this nut into or out of the spring the number of active turns may be varied and thereby adjust the characteristic of the spring. This adjustment is also possible with anchor 31. When the proper number of active turns of the spring have been selected, the spring is adjusted to the desired tension by adjusting screw 38. This tension is such as will balance a particular steam pressure as for example the value at which it is desired to maintain the steam pressure in header 6 constant. Thus, if the pressure rises above or falls below this value, the lever will be out of equilibrium and will operate the pilot valve 26 in the proper direction.

In order to prevent excessive swings of lever 25 in either direction, a stationary but adjustable stop 39, which is threaded into an abutment 40 in which fulcrum 29 is secured and an adjustable stop 41 are provided, stop 41 being secured to lever 25. Stop 39 limits the upward swing of lever 25 and stop 41 the downward swing.

Pilot valve 26 comprises a body 42 having an inlet 43 to which a pipe line 44 is connected and having compressed air or other fluid under constant pressure therein, an outlet 45 to which a sending or impulse line 46 is connected, and an exhaust port 47. The exhaust port is formed at the inner end of a hollow bushing 48 which is screw threaded into the body. The inlet and exhaust ports 43 and 47 are under the control of a valve 49. Valve 49 is provided with tapered surfaces at its opposite ends and arranged to coact with and control the extent of opening of the inlet and exhaust ports.

Valve 49 is provided with a circumferential flange 50 between which and the inlet end of the valve body a coil spring 51 is disposed that normally urges the valve towards wide open position; i. e., the spring urges the valve upwardly to that position in which the exhaust port would be completely closed and the inlet port completely open.

Operative connection between valve 49 and the lever 25 is provided by means of a stem 53 that rests on an extension of valve 49. The upper end of stem 53 abuts an adjustable stop 55 which is threaded through a yieldable resilient member 56 formed as an extension of lever 25. Yieldable member 56 insures that valve 49 will not be damaged in case lever 25 should overtravel in its downward swings.

If valve 49 is in its closed position, that is in the position in which exhaust port 47 is closed, the pressure delivered from the supply line 44 to the sending or impulse line 46 will be equal to the pressure in the supply line. If this valve is completely closed, that is, when in position to completely close the inlet port 43, the pressure medium in the sending or impulse line will exhaust to the atmosphere through the exhaust port and therefore reduce the pressure in the sending line to atmospheric.

If valve 49 is in any position between wide open or fully closed positions, the pressure in the sending or impulse line will be equal to the pressure within the valve body which pressure will be proportional to the relative rates at which air flows into the valve body and escapes therefrom through the exhaust port. By means of valve 49, the pressure transmitted to the sending line may be varied by infinitesimal steps from the minimum value, in this case atmospheric valve, to the maximum pressure in the supply line.

The sending line 46 is connected by branch pipes 58 and 59 to the loading bellows 19 of the outlet damper regulator 8 and to the anticipator device 21.

*Outlet damper regulator*

The outlet damper regulator 8, as illustrated in Fig. 2, comprises a motor device 60 of the cylinder, piston type, and a pressure responsive device 61 of the inverted float or bell type which controls the movements of the piston.

The motor comprises a frame consisting of side bars 62 that are guided in the cylinder heads of the cylinder and which are connected at their upper and lower ends by means of crossheads 63. The upper crosshead is secured to the piston rod 64 of the piston and is connected by a link 65 to the crank of damper 7. Movement of the piston may be effected either by water pressure or by compressed air, preferably the latter. The source of motive fluid which operates the piston is received from a supply line 66 connected to a pilot valve 67 mounted on the cylinder. The stem 68 of the pilot valve is connected to a lever 69 which is fulcrumed at 70 in a clevis 71 formed at the outer end of the horizontal arm 72 of a bell crank, and the other end of the lever is connected by a link 73 to the float mechanism 61. The vertical arm 74 of the bell crank is provided with a roller 75 which rides on the inner face of a compensating or angling bar 76 carried by the regulator frame and this roller is held in firm contact with the bar by a tension spring 77. One end of spring 77 is secured to a lug 78 on the cylinder and the other is attached to an arm 79 which extends downwardly from the knee of the bell crank. The tension in this spring is such that the bell crank is always urged in a clockwise direction as seen from Fig. 2.

If link 73 is moved upwardly by the float mechanism, lever 69 turns counterclockwise, moving valve stem 68 downwardly whereby motive pressure is admitted to the cylinder at the lower side of the piston causing the frame to move upwardly. When the regulator frame has moved upwardly a predetermined distance bell crank 72—74 swings in a clockwise direction, i. e., in the direction of arrow I', and returns the valve to off position. If link 73 is moved upwardly again the same action occurs, that is the regulator moves upwardly another predetermined distance until the valve is returned to off position by the bell crank. Upward movement of link 73 and the resultant downward movement of the valve stem with the resultant upward movement of the regulator frame are indicated by arrows I, and the return movement of the valve to closed position as effected by bell crank 72—74 and the angling or compensator bar 76 are indicated by arrows I'. These movements of the valve operating mechanism and regulator frame occur in response to decreased steam pressure in the boiler steam drum or header 6, or in other words, to increased load.

If link 73 moves downwardly in the direction of arrow D lever 69 turns clockwise, moving the pilot valve stem upwardly in the direction of arrow D, and causing motive fluid to be admitted at the upper end of the cylinder so as to act on the upperside of the piston and cause the regulator frame to move downwardly. When the frame has moved downwardly a predetermined distance, the bell crank 72—74 swings in the direction of arrows D', and the valve is moved downwardly to off position in the direction indicated by the arrow D'. If link 73 is moved downwardly again the same action occurs until the valve is returned to off position through the action of the compensating bar, bell crank and lever. Thus, whichever way the regulator frame is moving, the same is brought to rest each time it has moved a predetermined distance, so that step-by-step movement of the regulator frame is attained in either direction.

The float mechanism comprises a beam 82 which is fulcrumed on a jeweler's point 83 and inverted floats or bells 84 and 85 secured to opposite ends of the beam. The lower ends of these floats are open and immersed in liquid such as oil or water contained in a tank 86. Link 73 which operates the pilot valve is connected to the float beam as at 87.

The interior of float 85 is in communication with the atmosphere, a pipe 88' being provided for this purpose that extends upwardly through the lower end of the tank and into the interior of the bell at a point above the liquid level in the tank. The interior of bell 84 is placed in pressure communication with the outlet of furnace 1 by means of a pipe 88, one end of which extends upwardly through the tank and into the interior of the bell and terminates at a point well above the liquid level in the tank. Thus, as the pressures in bells 84 and 85 vary, the float beam will rock in one direction or the other and operate the pilot valve 67 of the regulator.

The loading bellows 19 hereinbefore mentioned, is mounted on a cover 89 of the tank and is disposed within a pressure-tight chamber 90 to which branch pipe 58, leading from the master regulator, is connected. The bellows is operatively connected to that end of the float beam at which float 84 is mounted by means of a push rod 92, a lever 93 fulcrumed at 94 on cover 89, and a link 95 which connects the lever to the float beam. Thus, when the pressure delivered by the master regulator to chamber 90 is increasing, the bellows collapses or contracts and tends to rock the float beam 82 in clockwise direction.

When the float beam tends to turn in a clockwise direction, in response to an increased loading pressure, the regulator frame is caused to move downwardly until the pressure in the outlet of the furnace which acts on the interior of the float 84, is in balance with the force exerted by bellows 19 on the float beam. When the regulator frame moves downwardly the outlet damper 7 is shifted towards closed position so that the pressure at the outlet of the furnace tends to increase. This increased pressure eventually balances the loading pressure sent by the master regulator to bellows 19.

If the master regulator operates to reduce the loading pressure acting on the bellows in chamber 90, the float beam tends to turn in a counter-clockwise direction causing the pilot valve 67 to be operated in such direction that the regulator frame moves upwardly whereby the outlet damper is adjusted towards open position. The regulator frame will continue to move upwardly until the pressure in the outlet of the furnace is reduced to a value which balances the reduced loading pressure sent by master regulator 18.

The regulator which operates the air supply regulating damper 9 may be of the same construction as regulator 8 except that the loading bellows 19 and the lever system which connects the same to the float beam are omitted.

When a regulator such as shown in Fig. 2, with the loading bellows omitted, is utilized to operate the air supply damper 9, inverted bell 85 is connected by a pipe to the interior of the furnace combustion chamber and bell 84 is open to communication with the atmosphere so that as the pressure in the combustion chamber increases in response to adjustment of the outlet damper towards closed position, or if it decreases in response to adjustment of the outlet damper towards open position, the regulator frame is caused to either adjust the air supply damper towards closed or open position, respectively, so as to maintain the pressure in the furnace combustion chamber substantially constant.

Since the regulator which operates the air supply damper functions in response to changes in pressure in the furnace as effected by the position of the outlet damper, it follows that the air supply is regulated by and in accordance with changes in steam pressure, or the load demand, because the position of the outlet damper is determined by the loading imposed on the loading bellows 19 in accordance with the loading pressure set up by the master regulator which as stated previously herein, functions by and in accordance with changes in steam pressure.

Regulator 17

Figures 5, 6, 7, 8:
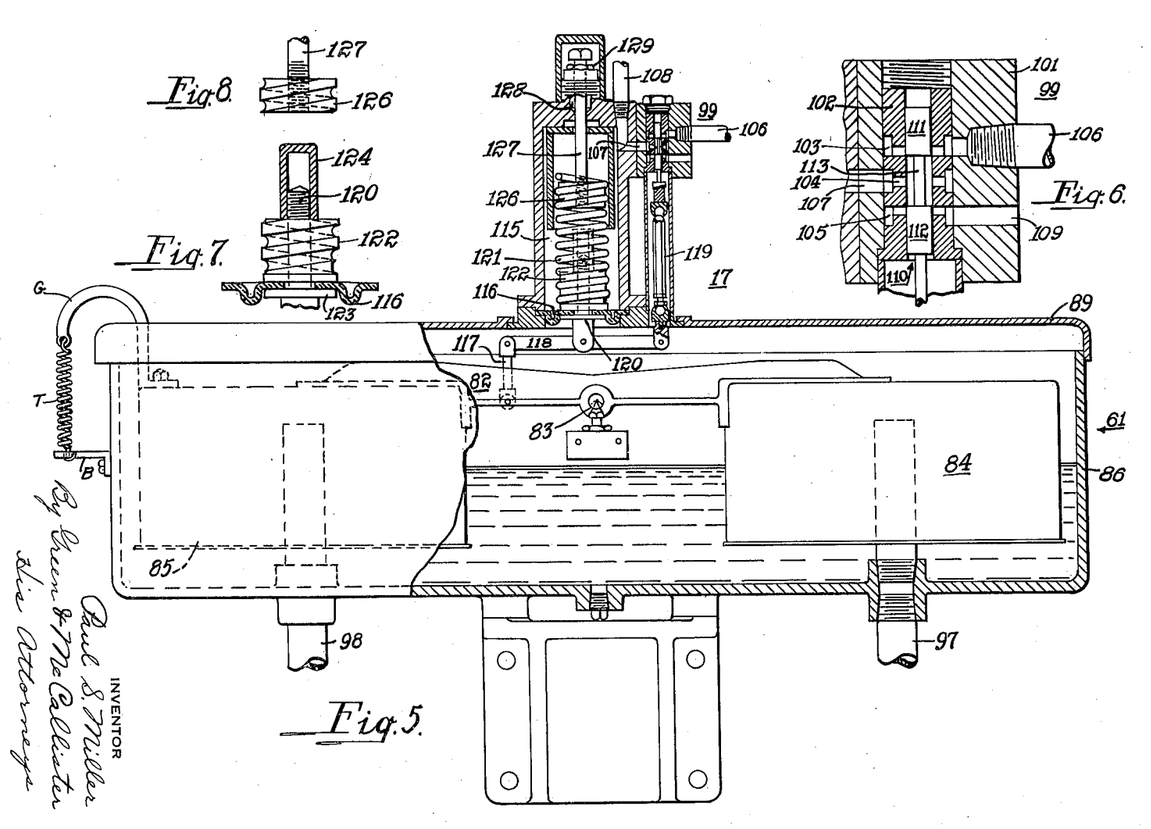
Fig. 5 is a view of another regulator embodied in the system of Fig. 1.
Fig. 6 is an enlarged view of a pilot valve of the regulator of Fig. 5.
Figs. 7 and 8 are views in side elevation of blocks to which a spring embodied in the regulator of Fig. 5 is attached and which provide means for adjusting the number of active turns of the spring, the block in Fig. 7 being shown in connection with a diaphragm and a stop nut.

Regulator 17 includes a pressure sensitive float mechanism 61 such as described in connection with the regulator shown in Fig. 2, except that it is modified by the omission of loading bellows 19 and the addition of a tension spring T which yieldingly opposes clockwise movement of the float beam 82. One end of spring T is anchored in a bracket B attached to the float container or tank 86 and the other end is attached to a goose neck bracket G secured to float 85 and extending through an opening in the tank cover.

Since these float mechanisms are in other respects similar in construction and operation, corresponding parts are designated by the same reference characters.

Float 84 of the float mechanism shown in Fig. 5 is connected by a pipe 97 to the pipe 88 and therefore to outlet of the furnace and responds to the same pressure as float 84 of regulator 8. Float 85 of this regulator is connected by a pipe 98 to the gas passage of the furnace at such a distance from the furnace combustion chamber that the accumulation of slag, soot, or ash will not affect the pressure drop between this point and the outlet of the furnace. Float mechanism 61 of regulator 17, therefore, in effect, measures the quantity of gas flowing to the outlet of the furnace.

As variations in pressure as communicated to floats 84 and 85 of regulator 17 vary, the float beam rocks, and this rocking movement is utilized to operate a pilot valve 99 which transmits pressures to a pressure responsive element 100 which controls the operation of the rheostat operating motor 16 during the periods between changes in load on the boiler.

Pilot valve 99 is illustrated in detail in Fig. 6 and comprises a valve body 101 having a bushing 102 therein provided with inlet, outlet, and exhaust openings 103, 104 and 105 that communicate, respectively, with a pressure supply pipe 106, an outlet port 107 which leads to a pressure sending line 108, and an exhaust port 109. The openings in the bushing of the valve body are controlled by valve plug 110 having enlarged portions 111 and 112 connected by a stem 113 of smaller diameter.

When valve plug 110 is in the position shown in Figs. 5 and 6, the inlet 103 and exhaust port 109 are closed so that whatever the pressure in the outlet or sending line 108 was before this valve was returned to the position shown, will be maintained in this line. If the valve plug is moved upwardly, air pressure is transmitted through the inlet opening 103 into the interior of bushing 102 and passes out through the outlet port 107 to the sending line 108 and into a chamber 115 in which a diaphragm 116 is located.

If the valve plug 110 is moved downwardly, the exhaust port 109 is uncovered and places it in communication with the outlet port 107, the sending line 108, and the diaphragm chamber 115 so that air pressure may exhaust to the atmosphere and reduce the pressure in the sending line and the chamber.

The float beam 82 is connected to the valve plug 110 by a link 117, a lever 118, and a link 119 and diaphragm 116 is connected to lever 118 with a clevis bolt 120 at a point between the ends thereof.

The diaphragm 116 is connected to a tension spring 121 by means of a nut 122 (see Fig. 7). This nut has screw thread engagement with the spring and may be utilized to predetermine the number of active turns of the spring which are utilized.

The diaphragm is clamped between the lower ends of nut 122 and a flange 123 formed as part of the clevis bolt 120, the clamping pressure being obtained with a cap nut 124 which is threaded on the bolt and bears on the upper end of nut 122. Cap nut 124 also serves as a stop to limit upward movement of the diaphragm.

The upper end of spring 121 has screw thread engagement with a nut 126 secured to a rod 127 that extends upwardly through a stuffing box 128 in the upper end of pressure chamber 115. The upper end of this rod is threaded to accommodate a locknut 129 whereby the tension in spring 121 may be adjusted to any desired value depending upon the relation to be maintained between the pressure transmitted to sending line 108 and the pressures acting on floats 84 and 85.

When the weight of gases passing through the boiler increases, after a given setting of the outlet damper 7, float beam 82 tends to turn in a clockwise direction causing the valve plug 110 to move downwardly and effect a reduction in the pressure in sending line 108 and in the diaphragm chamber 115. As the pressure in the diaphragm chamber is reduced the diaphragm moves upwardly under the action of spring 121 whereby the valve plug is returned to off position and further reduction in pressure in the sending line and the chamber delayed until another change in pressure drop as reflected in floats 84 and 85 occurs to move the valve plug downwardly again. As the pressure in the sending line 108 is reduced, device 100 causes device 16 to so adjust rheostat 15 that an increase in the feeder motor speed and an increased rate of supply of fuel to the furnace are effected.

If the weight of gases flowing to the outlet of the boiler is decreasing after a given setting of damper 7, the opposite action takes place, that is the float beam tends to turn in a counterclockwise direction whereby valve plug 110 is moved upwardly so that the pressure in the sending line 108 and in the diaphragm chamber 115 is increased. When the pressure increases a predetermined amount, the diaphragm is moved downwardly and valve plug 110 returned to off position. A further decrease in air flow will produce the same action again so that the pressure transmitted to the sending line 108 and to the diaphragm chamber 115 will be increased step-by-step and motor 16 operated in accordance with such changes until the rate of fuel supply is in balance with the rate of air supply.

Variations in pressure in sending line 108 are utilized to actuate a bellows 131 of device 100 disposed in a pressure-tight chamber 132. When the pressure delivered to chamber 132 is increasing, the bellows tends to contract which contraction is yieldingly opposed by a compression spring 133. Bellows 131 is connected by a push rod 134 to a floating lever 135 which in turn is connected by a link 136 to a lever 69 that operates the pilot valve 67 of motor 16. This lever corresponds to lever 67 of the pilot valve operating mechanism shown in Figs. 2 and 3 and previously described herein.

Motor device 16 is identical in construction to the regulator motor 60 of Fig. 2.

When the pressure impulses delivered to chamber 131 of device 100 are increasing, the movement of the frame of device 16 is generally upward so that the rate of fuel supply to the furnace is decreased; if these pressure impulses are decreasing the frame of device 16 moves generally downwardly and the fuel supply is increased in accordance therewith.

As stated heretofore, the pressure impulses delivered to device 100 vary by and in accordance with variations in the amount or weight of gases passing through the boiler passes, so that for any given setting of damper 7 or any adjustments thereof as are effected only by changes in pressure in the outlet of the furnace, device 100 will cause the fuel supply rate to vary by and in accordance with such changes.

However, when a change in the load demand occurs, the change in steam pressure causes master regulator 18 to function. Immediately regulator 8 adjusts damper 7 in the proper direction and simultaneously, anticipating device 21 causes device 16 to operate and adjust the fuel supply in the proper direction so that the proper ratio between the fuel and air supply is maintained, even though the load increases or decreases. Device 21, however, only operates for such a period of time as is required of regulator 17 to be re-adjusted to the new boiler load or rating after which regulation of the fuel supply is controlled primarily by regulator 17.

Anticipator 21

Anticipator 21 comprises a bellows 138 disposed within the pressure-tight chamber 139 to which pressure impulses are transmitted from master regulator 18, and a pressure-tight chamber 140 having a bellows 141 therein. Chambers 139 and 140 are connected by a pipe or passage 142.

Bellows 138, when contracting, operates against a compression spring 143, and bellows 141, when contracting, operates against a compression spring 144, and when expanding, it operates against a compression spring 145. Springs 144 and 145 tend to urge bellows 141 to a neutral or fixed position, in which position the springs balance each other.

Pressure chamber 140 and bellows 138 are filled with a liquid such as oil, and this liquid has communication with a surge tank 147 in which a quantity of the liquid is stored. A needle valve 148 in the connection 149 between surge tank 147 and chamber 140 determines the length of time that device 21 is operative to adjust the fuel supply as will be apparent from the following description of operation.

When the load on the boiler decreases (the steam pressure increases), master regulator 18 sends an increasing pressure impulse to chamber 139, causing bellows 138 to contract and force liquid into chamber 140. Such displacement of liquid requires bellows 144 to contract because the liquid cannot pass needle valve 148 as fast as it is forced into chamber 140. When bellows 144 contracts, it moves a push rod 150 connected to floating lever 135, upwardly, causing the fuel supply to be decreased. As the liquid gradually passes the needle valve into surge tank 147, the pressure in chamber 140 gradually decreases so that after a period of time, as fixed by the setting of needle valve 148, bellows 144 returns to its neutral or initial position. By the time bellows 144 has returned to its initial position, regulator 17 will have responded to the decrease in load and be in condition to regulate the fuel supply until the load changes to some other rating. If the load decreases again, the action above described is repeated.

If the load increases (the steam pressure decreases) master regulator 18 responds and reduces the pressure in chamber 139 and bellows 138 expands, causing liquid to flow from chamber 140 into bellows 138. As the pressure in chamber 140 is thereby reduced, bellows 144 expands, and rocks lever 135 in the direction required to cause device 16 to increase the fuel supply. As soon as the amount of liquid which has shifted from chamber 140 to bellows 138 has been replaced with liquid from the surge tank, bellows 144 returns to its normal or initial position. By this time the fuel supply will be under the control of regulator 17.

By adjusting the needle valve 149 it will be apparent that the length of time that device 21 is operative, may be adjusted in accordance with the time required for regulator 17 to be readjusted to a different load or boiler rating.

From the above description, it will be apparent that in the regulator system herein disclosed, the draft and air supply for the boiler are regulated by and in accordance with variations in the demand for steam and that under relatively steady load conditions the rate of fuel supply is regulated by and in accordance with the weight of gases passing through the boiler to the outlet of the furnace. When a load change occurs, the anticipator functions simultaneously with the master regulator and the adjustment in the draft, to immediately make a corresponding adjustment in the fuel supply. The anticipator functions for such a length of time as will permit the primary fuel regulator to re-adjust itself to the particular change in load or boiler rating.

During the time that anticipator 21 is functioning, the regulating effect which is initially exerted on the fuel supply regulating means diminishes at about the same rate as the control effect exerted by the primary fuel supply regulator 17 on the fuel supply regulating means is increasing. For this reason, the adjustment in the fuel supply, as initially made by the anticipator 21, is maintained until regulator 17 has fully readjusted itself to take control of the fuel supply at the changed boiler load.

This action will be apparent from the following specific example: If the change in boiler load is in such a direction that master regulator 18 sends out an increased pressure impulse to anticipator 21, requiring a decrease in the fuel supply and draft, the anticipator bellows 141 will rock lever 135 clockwise about its connection with push rod 134 thereby moving link 136 upwardly and raising the point at which it is attached to lever 135. As the weight of gases passing through the boiler decreases, regulator 17 functions to send increasing pressure impulses to chamber 132 causing bellows 131 to contract and raise push rod 134 at about the same rate that push rod 150 is being lowered (the rate at which rod 150 lowers being timed by the needle valve 148) so that the net result is, link 136 remains stationary in the position to which it was moved by anticipator 21.

If the boiler load increases, as indicated by a decrease in steam pressure, requiring an increase in draft, air and fuel supply, master regulator 18 sends a decreased pressure impulse simultaneously to both the draft regulator loading bellows 19 and the anticipator 21. The draft and fuel supply are thus increased simultaneously by and in accordance with the change in boiler load. The action of the anticipator is to lower link 136 to a position that will give that increased fuel supply adjustment which is necessary for the change in the draft and air supply. While the control effect of the anticipator is diminishing, the control effect of regulator 17 on the fuel supply regulating means is increasing with the net result, that link 136 remains in the position to which it was adjusted by anticipator 21 until regulator 17 has fully adjusted itself to the point where it can regulate the fuel supply by and in accordance with the rate of air supply, or the weight of gases passing through the boiler passages to the outlet of the furnace.

Thus, a system is illustrated in which the draft (a variable) and a temporary adjustment in the fuel supply are simultaneously made by and in accordance with the change in steam pressure; in which the effect of the temporary fuel adjusting means is caused to diminish at a rate proportional to the rate of change of the air supply or in the weight of gases passing through the boiler (a variable) as effected by the draft adjustment; and in which a control force is caused to change by and in accordance with air supply at about the same rate that the control effect of the temporary adjusting means is decreasing for finally and primarily regulating the fuel supply by and in accordance with the rate of air supply to the furnace.

While but one form of the invention has been shown and described herein, it will be apparent to those skilled in this particular art that various modifications and changes may be made without departing either from the spirit or the scope of the invention. It is desired, therefore, that only such limitations shall be placed on the invention as are imposed by the prior art and the appended claims.

What I claim as new and desire to secure by Letters Patent is:

1. In combination with a boiler furnace having adjustable sources of fuel and air supply, and an outlet damper for adjusting the draft, of a regulator for adjusting the outlet damper, a master regulator responsive to variations in demand for steam for creating pressure impulses that vary by and in accordance with the load demand, the outlet damper regulator responding to the draft in the furnace outlet and the pressure impulses to so adjust the damper as to maintain a balance between the draft and pressure impulses, a regulator responding to the amount of furnace gases flowing to the outlet for maintaining a predetermined relation between the air supply and rate of fuel supply, and means responsive to the pressure impulses of the master regulator for adjusting the fuel supply for a period of time such as will allow the furnace gas responsive regulator to respond to the change in load.

2. In combination with a boiler furnace having adjustable sources of fuel and air supply, and an outlet damper for adjusting the draft, of a master regulator responsive to changes in the boiler steam pressure, a regulator responsive to furnace draft and to the master regulator for shifting the draft damper by and in accordance with variations in steam pressure, a regulator for adjusting the air supply by and in accordance with changes in draft, a regulator for adjusting the rate at which fuel is supplied to the furnace in accordance with the rate at which air is supplied to the furnace, and means responsive to a change in boiler load for adjusting the rate of fuel supply for a predetermined length of time in advance of the fuel adjustments which are made in accordance with the air supply.

3. Regulating apparatus for boiler furnaces having means for supplying fuel to the furnace, apparatus for adjusting the draft and air supply by and in accordance with changes in the demand for steam, and primary apparatus for adjusting the fuel supply means subsequent to but in response to the adjustment in the air supply, and apparatus comprising pressure actuated mechanism adapted to respond directly to changes in the demand for steam for controlling and adjusting the rate of fuel supply during the interval between the adjustment in the air supply and the response of the primary apparatus to such adjustment.

4. Apparatus for controlling the delivery of fuel to a furnace having draft producing and air supply means, said apparatus comprising a motor device for controlling the fuel delivery means, means for regulating the furnace draft in accordance with the load demand, means for regulating the air supply in accordance with the draft, a pressure sensitive device operated by and in accordance with the variations in the weight of gases passing through the furnace for controlling the motor device, and a pressure sensitive load responsive device having a timing element for secondarily controlling the fuel delivery means for a predetermined length of time, as determined by the timing element, in response to a change in load on the furnace, so that the gas weight sensitive device may readjust itself to the change in load during the time period in which the secondary pressure sensitive device functions.

5. A control system having means responsive to a condition to be controlled for regulating a variable by and in accordance with changes in said condition and simultaneously but temporarily regulating another variable by and in accordance with changes in said condition, means responsive to the first-mentioned variable for finally regulating the second-mentioned variable, and means for gradually rendering the temporary adjusting means ineffective as the final regulating means becomes more and more effective.

6. A control system responsive to changes in a variable condition for regulating and maintaining a predetermined relationship between at least two variables by and in accordance with changes in said condition, wherein changes in one of which variables lags behind changes in a third variable, comprising means responsive to changes in said condition for regulating the third variable and substantially simultaneously but temporarily regulating the leading variable by and in accordance with changes in said condition, means responsive to changes in the lagging variable for finally regulating and controlling said leading variable by and in accordance with changes in said lagging variable, and means for gradually rendering ineffective the leading variable regulating means at about the same rate that the regulating effect of the lagging variable responsive means increases.

7. A control system for furnaces having means for regulating the combustion air supply by and in accordance with changes in draft, means for regulating the fuel supply by and in accordance with the weight of gases passing through the furnace to the furnace outlet, means operating simultaneously with adjustments in the draft for adjusting the fuel supply regulating means by and in accordance with the draft adjustments, and means for gradually rendering said last-mentioned fuel supply adjusting means ineffective at about the same rate that the air supply rate changes from one value to another in response to a change in draft from one value to another.

8. Apparatus for regulating the rate at which fuel is supplied to a boiler furnace by and in accordance with changes in the boiler load and by and in accordance with the rate at which air is supplied to the furnace, comprising a fuel feed regulating element for controlling the fuel supply rate, a regulating element actuated by and in accordance with changes in the boiler load for temporarily actuating the regulator element to effect the proper rate of fuel supply, means for regulating the draft by and in accordance with the boiler load, means for regulating the air supply by and in accordance with the draft, a second regulating element actuated by and in accordance with the rate of air supply to the furnace, and means for gradually rendering the load responsive regulating element ineffective at about the same rate that the air flow responsive element becomes increasingly effective to finally operate the fuel feed regulating element by and in accordance with the rate of air supply.

9. A device for operating a regulating member by and in accordance with changes in separate variable conditions, the changes in one of which variables lags behind changes in the other variable, comprising a leading regulating element responsive to changes in the leading variable and a lagging regulating element responsive to changes in the lagging variable, a floating lever connected to said regulating elements and a connection from the regulating member to the floating lever such that the regulating member may be actuated initially by the element which responds to the leading variable and finally actuated by the element which responds to the lagging variable, and means for decreasing the control effect of the leading regulating element at substantially the same rate as the control effect of the lagging regulating element is increasing.

10. A device according to claim 9 characterized by that the leading regulating element comprises a pressure tight chamber having a pressure sensitive bellows therein adapted to expand or contract in response to pressure impulses delivered to the chamber, a second pressure tight chamber having communication with the interior of said bellows and each having a non-compressible liquid therein, a bellows disposed in said second chamber and having an operative connection with said floating lever, springs opposing movement of said second mentioned bellows in either direction, and normally urging it to an initial position, and a surge chamber communicating with said second mentioned chamber and having a restricted orifice in the communicating passage, whereby in response to increasing pressure impulses applied to the first mentioned chamber, the bellows in the second chamber is caused to contract and actuate said floating lever but to gradually return to its initial position as fluid is displaced into the surge chamber, and upon a decreased pressure impulse, the first mentioned bellows expands, causing liquid to flow in the same direction from the second chamber causing the second bellows to expand and operate the floating lever in the opposite direction but gradually returning to its initial position as liquid returns from the surge chamber to the second chamber.

11. A device according to claim 9, characterized by that the lagging regulating element comprises a pressure tight chamber having a yieldable element therein connected to said floating lever and responding to pressure impulses that vary by and in accordance with changes in the lagging variable.

12. A method of controlling the operation of a boiler furnace, which consists in initially adjusting the rate of fuel feed in accordance with the demand for steam, measuring the total weight of gases traversing the furnace, and then in maintaining or gradually varying the adjusted rate of fuel feed to cause it to correspond to the weight of gases traversing the furnace.

13. A method of controlling the operation of a boiler furnace which consists in initially adjusting the rate of fuel feed in accordance with the demand for steam and independently of furnace combustion gas pressure conditions, varying the delivery of air to the furnace to correspond to the adjusted fuel feed, and then maintaining or gradually varying the rate of fuel feed to cause it to correspond to the resulting furnace combustion gas pressure conditions.

14. A method of controlling the operation of a boiler furnace which consists in initially adjusting the rate of fuel feed to the furnace in response to the demand for steam and independently of furnace combustion gas pressure conditions, varying the delivery of air to the furnace in response to the demand for steam as modified by gas pressure conditions within the furnace, and in maintaining or gradually varying the adjusted rate of fuel feed to cause it to correspond with furnace combustion gas pressure conditions.

15. A method of controlling the operation of a boiler furnace which consists in initially adjusting the rate of fuel feed and the furnace draft, in response to the demand for steam and independently of furnace combustion gas pressure conditions, varying the delivery of air to the furnace in response to the variation in the draft as modified by furnace combustion gas pressure conditions, then in maintaining or gradually varying the adjusted rate of fuel feed to cause it to correspond to the weight of gases traversing the furnace, while adjusting the draft to correspond to the demand for steam and the gas pressures adjacent the gas outlet of the furnace.

16. A system of control for boiler furnaces, including a fuel feeding mechanism, a control therefor for varying the rate of fuel feed, means movable in response to variations in steam demand for effecting an initial adjustment of said control in response to steam demand and then movable independently of the steam demand in a direction opposed to its steam demand responsive movement, and means responsive to furnace combustion gas pressure conditions for maintaining an adjustment of said control occasioned by said first mentioned means.

17. A control system, including means for regulating a variable, a control for said means, a mechanism movable in response to a variable condition to be controlled for effecting an initial adjustment of said control in response to such condition and then movable independently thereof, and means movable in response to another variable condition for maintaining an adjustment of said control as effected by said mechanism.

18. A system of control for boiler furnaces, including a fuel feeding mechanism, a control therefor for varying the rate of fuel feed, means movable in response to variations in steam demand for effecting an initial adjustment of said control in response to steam demand and then movable independently of the steam demand in a direction opposed to its steam demand responsive movement, and means responsive to the difference in pressure existing at spaced points in the gas passage of the furnace for maintaining an adjustment of said control occasioned by said first-mentioned means.

19. A control system for furnaces having means for regulating the combustion air supply by and in accordance with changes in draft, means responsive to the drop in pressure between spaced points in the furnace gas passage for regulating the fuel supply by and in accordance with the weight of gases passing through the furnace to the furnace outlet, means operating simultaneously with adjustments in the draft for adjusting the fuel supply regulating means by and in accordance with the draft adjustments, and means for gradually rendering said last-mentioned fuel supply adjusting means ineffective at about the same rate that the air supply rate changes from one value to another in response to a change in draft from one value to another.

PAUL S. MILLER.